US012638083B2

(12) United States Patent
Zhao et al.

(10) Patent No.: US 12,638,083 B2
(45) Date of Patent: May 26, 2026

(54) CARTRIDGE SEALING DEVICE WITH SEMI-SOLID MUD FILLER AND CONFIGURED TO BE MOUNTED TO FLUID EQUIPMENT

(71) Applicant: AIGI Environmental Inc., Nanjing (CN)

(72) Inventors: Jingwei Zhao, Nanjing (CN); Jun Zhang, Nanjing (CN)

(73) Assignee: AIGI ENVIRONMENTAL INC., Jiangsu (CN)

( * ) Notice: Subject to any disclaimer, the term of this patent is extended or adjusted under 35 U.S.C. 154(b) by 0 days.

(21) Appl. No.: 19/196,305

(22) Filed: May 1, 2025

(65) Prior Publication Data

US 2026/0117873 A1      Apr. 30, 2026

(30) Foreign Application Priority Data

Oct. 31, 2024      (CN) .......................... 202411546595.0

(51) Int. Cl.
*F16J 15/34*              (2006.01)

(52) U.S. Cl.
CPC ......... *F16J 15/348* (2013.01); *F16J 15/3448* (2013.01)

(58) Field of Classification Search
CPC .............................. F16J 15/348; F16J 15/3448
See application file for complete search history.

(56) References Cited

U.S. PATENT DOCUMENTS

| | | | | |
|---|---|---|---|---|
| 2,130,741 A | * | 9/1938 | Mcclain ................. | F16J 15/184 411/389 |
| 2,244,135 A | * | 6/1941 | Wallace ................. | F16J 15/184 277/615 |
| 3,199,876 A | * | 8/1965 | Magos ................... | F16J 15/181 251/355 |
| 4,540,184 A | * | 9/1985 | Takahashi ............... | F28F 21/04 165/47 |
| 2005/0230106 A1 | * | 10/2005 | Mahoney ................ | E21B 33/03 166/244.1 |
| 2013/0153049 A1 | * | 6/2013 | Kang ..................... | F16J 15/184 137/15.17 |

FOREIGN PATENT DOCUMENTS

| | | |
|---|---|---|
| CN | 201875137 U | 11/2010 |
| CN | 114688073 A | 12/2020 |
| CN | 215672853 U | 6/2021 |

* cited by examiner

*Primary Examiner* — Vishal A Patel
(74) *Attorney, Agent, or Firm* — Volpe Koenig

(57) ABSTRACT

The application relates to a cartridge sealing device comprising a shaft sleeve, a locking ring, a shaped sealing ring assembly comprising first and second shaped sealing rings, a semi-solid mud filler, a cylindrical main gland forming a cylindrical space with the shaft sleeve and having a threaded joint, an annular auxiliary gland, a support frame comprising one or more axial rods, and one or more detachable positioning blocks. The one or more axial rods is configured such that an interval between the first and second shaped sealing rings can be varied between a minimum interval and a maximum interval. The threaded joint is adapted to be connected to an external injector for injecting the filler to increase a sealing pressure in the cylindrical space or to be blocked such that the sealing pressure can be adjusted by a pre-tightening mechanism securing the auxiliary gland to the main gland.

11 Claims, 12 Drawing Sheets

CARTRIDGE SEALING DEVICE WITH SEMI-SOLID MUD FILLER AND CONFIGURED TO BE MOUNTED TO FLUID EQUIPMENT

CROSS-REFERENCE TO RELATED APPLICATION

The application claims the benefit of priority of Chinese Patent Application No. 202411546595.0, filed on Oct. 31, 2024, and entitled "Cartridge Sealing Device with Semi-solid Mud Filler and Configured to be Mounted to Fluid Equipment", the contents of which are incorporated in full by reference herein.

TECHNICAL FIELD

The present application relates to sealing technology for fluid equipment and in particular to a cartridge sealing device with a semi-solid mud filler and configured to be mounted to fluid equipment.

BACKGROUND

A large amount of fluid (such as gas, a mixture of gas and liquid, and liquid) is transported through a pump or other fluid equipment in industrial continuous production. The pump generally comprises an enclosure and a rotating shaft. The rotating shaft passes through a port of the enclosure and rotates at a high speed to transport or pressurize the fluid in the enclosure during an operation of the pump. Thus, a sealing device is mounted between the port of the enclosure and the rotating shaft to prevent the fluid from leaking through the port, thereby effectively and safely guaranteeing the operation of the pump. The sealing device can fail and need to be replaced by shutting the pump down.

Currently, the sealing device includes a mechanical seal, a packing seal, and a seal with a semi-solid mud filler that can form a laminar shear flow.

The mechanical seal is defined in relevant national standards as at least one pair of sealing elements with end faces perpendicular to a rotation axis and kept in slidable contact with each other under a pressure from a fluid and an elastic force or magnetic force from an auxiliary mechanism, thereby preventing the fluid from leaking.

The mechanical seal, which has a sealing ring that is made of rigid material, has a good sealing effect, a long service life, but a high requirement for machining, a high price and a frequent maintenance.

The packing seal has a packing part that is plastically deformed by a fixing part and a rotating shaft so as to produce a contact seal with the shaft. As the packing part can be worn and wear the rotating shaft at the same time, the packing seal needs flushing water and leaks in a small amount, but is cheap and simple and convenient to maintain and replace. Chinese Patent Publication CN 114688073A discloses a packing seal in which a shaft sleeve for reducing wear of a rotating shaft, a packing part and a gland are integrated into a cartridge for easy replacement, however, the packing seal needs to be replaced frequently due to wear of the packing part.

Chinese Utility Model CN 201875137U and Chinese Utility Model CN 215672853U disclose a seal with a semi-solid mud filler that can form a laminar shear flow. The seal as described in Chinese Utility Model CN 215672853U can be used in a pump and has a cavity formed by two sealing rings, in which the filler is injected, and the filler supported by a support frame to have a compressive strength, thus, the seal doesn't cause wear on a rotating shaft, doesn't need flushing water, doesn't have any specification restrictions, can be maintained online and be mounted to a rotating shaft and an enclosure of the pump easily. However, as the laminar shear flow formed by the filler has a part tightly wrapping around and rotating with the rotating shaft during an operation of the pump, it is necessary, during the seal's maintenance, to damagingly disassemble the seal to remove the part completely from the rotating shaft and refill the filler after other parts of the seal are maintained and replaced, increasing the maintenance's cost. In addition, the existing support frame can only provide the compressive strength, but cannot prevent the filler from overheating, expanding or even losing as measured by % loss on ignition (LOI) as a sealing pressure in the cavity is accumulated during the injection of the filler.

With the development of modern industrial technology, the mechanical seal has been gradually adopted for fluid equipment under better working conditions, while the packing seal or the seal with the semi-solid mud filler that can form the laminar shear flow is still required for fluid equipment under worse working conditions, in which the fluid equipment contains a fluid with a lot of impurities such as mud or foreign particles. When these impurities penetrate into a sealing surface between a rotating shaft and a packing part, wear of the rotating shaft and the packing part is aggravated, thereby damaging a sealing effect and greatly reducing a service life of the seal and increasing frequency of the seal's maintenance.

SUMMARY

An object of the present application is to provide an improved a cartridge sealing device with a semi-solid mud filler and configured to be mounted to fluid equipment.

According to one aspect of the present application, there is provided a cartridge sealing device configured to be mounted to a port of an enclosure of fluid equipment through which a rotating shaft is inserted for preventing fluid within the enclosure from leaking through the port, the cartridge sealing device comprising a shaft sleeve, a locking ring, a shaped sealing ring assembly, a semi-solid mud filler, a cylindrical main gland, an annular auxiliary gland, a support frame, and one or more detachable positioning blocks that are all mounted around the rotating shaft, wherein: the main gland has a cylinder at its front end and a step-shaped portion at its rear end, the step-shaped portion extending outwardly relative to the cylinder; the step-shaped portion is configured to be fastened to a rear end face of the enclosure surrounding the port, while the cylinder passes through the port, thereby forming a gap between an outer peripheral surface of the cylinder and an inner wall surface of the enclosure that forms the port to allow the fluid to flow therein; the cylinder has an inner peripheral surface surrounding an outer peripheral surface of the shaft sleeve to form a cylindrical space within which the shaped sealing ring assembly and the filler are filled and within which the filler is flowable; the step-shaped portion comprises a through hole extending from an outer peripheral surface to an inner peripheral surface of the step-shaped portion to communicate with the cylindrical space, the through hole having a portion forming a threaded joint that is close to the outer peripheral surface of the step-shaped portion; the shaped sealing ring assembly comprises a first shaped sealing ring and a second shaped sealing ring between which the filler is located; the number of each of the first shaped sealing ring and the second shaped sealing ring is at least one and/or each of the first shaped sealing ring and the second shaped sealing ring is formed as separable components; the auxiliary gland is fastened to a rear end face of the step-shaped portion by means of a pre-tightening mechanism such that a front end of the auxiliary gland protrudes axially forward into the cylindrical space from the rear end face of the step-shaped portion and abuts against the second shaped sealing ring; the support frame comprises one or more axial rods located between the first shaped sealing ring and the second shaped sealing ring and suspended in the cylindrical space; the locking ring surrounds a rear end of the shaft sleeve to secure the shaft sleeve to the rotating shaft; the one or more detachable positioning blocks are configured to connect the locking ring to the auxiliary gland such that the cartridge sealing device can be mounted around or removed from the rotating shaft in one step and are configured to be removed from the locking ring and the auxiliary gland such that the locking ring and the shaft sleeve can rotate with the rotating shaft during an operation of the fluid equipment; the one or more axial rods are configured such that an interval between the first shaped sealing ring and the second shaped sealing ring can be varied between a minimum interval and a maximum interval; and the threaded joint is adapted to be connected to an external injector for injecting the filler into the cylindrical space so as to increase a sealing pressure formed in the cylindrical space or to be blocked such that the sealing pressure can be adjusted by the pre-tightening mechanism.

Optionally, the cartridge sealing device has an axial length from a front end face of the first shaped sealing ring to a front end face of the step-shaped portion that is more than twice an axial length from a rear end face of the second shaped sealing ring to the front end face of the step-shaped portion.

Optionally, the cartridge sealing device further comprises an additional cylinder formed integrally with a front end of the cylinder and having an inner peripheral surface forming a spiral groove or a front end face forming a plurality of notches radially spaced from each other and extending from an outer peripheral surface to an inner peripheral surface of the additional cylinder; and/or the cartridge sealing device further comprises an additional shaft sleeve formed integrally with a front end of the shaft sleeve and having an outer peripheral surface forming a plurality of toothed rings axially spaced from each other or a front end face forming a plurality of notches radially spaced from each other and extending from an outer peripheral surface to an inner peripheral surface of the additional shaft sleeve.

Optionally, the spiral groove has a start point that is close to or located at the front end face of the additional cylinder and an end point that is close to or located at a rear end face of the additional cylinder and is separated from the cylindrical space and has a radial depth, axial width and/or a sectional area that remain constant or gradually increase from the start point to the end point.

Optionally, the plurality of toothed rings are separated from the cylindrical space and have any one of straight teeth, oblique teeth, helical teeth or a combination thereof.

Optionally, the filler is made from a mixture of fiber and lubricant that is made from a mixture of solid powder and oil.

Optionally, the support frame further comprises a first support ring abutting against a rear end face of the first shaped sealing ring and a second support ring abutting against a front end face of the second shaped sealing ring, and each of the one or more axial rods comprises a first tip, a first stopper protruding relative to the first tip, a second tip and a second stopper protruding relative to the second tip, the first tip being slidably inserted into the first support ring and the second tip being slidably inserted into the second support ring such that the first stopper abuts against the first support ring and the second stopper abuts against the second support ring when the minimum interval is reached.

Optionally, the pre-tightening mechanism comprises a bolt passing through a hole axially extending through the auxiliary gland and screwed into a threaded hole formed on a rear end face of the step-shaped portion and a spring mounted around the bolt, the auxiliary gland being fastened to the main gland by a pre-tightening force provided by compressing the spring such that the auxiliary gland can be axially displaced relative to the main gland by resisting against the pre-tightening force and a gap can be present between a front end face of a rear end of the auxiliary gland that does not protrude into the cylindrical space and the rear end face of the step-shaped portion, and the spring being completely compressed when the maximum interval is reached.

The cartridge sealing device provided in the present application can have improved reliability and safety, is easy to mount and dismount during maintenance and repair of the fluid equipment, eliminates a sealing failure caused by artificial installation, enhances a service life when the fluid in the fluid equipment contains a lot of impurities, and can be widely used and cost effective.

BRIEF DESCRIPTION OF THE DRAWINGS

The foregoing and other aspects of the present application will be more fully understood through the following detailed description made with reference to the accompanying drawings, in which.

DETAILED DESCRIPTION

Figure 1:
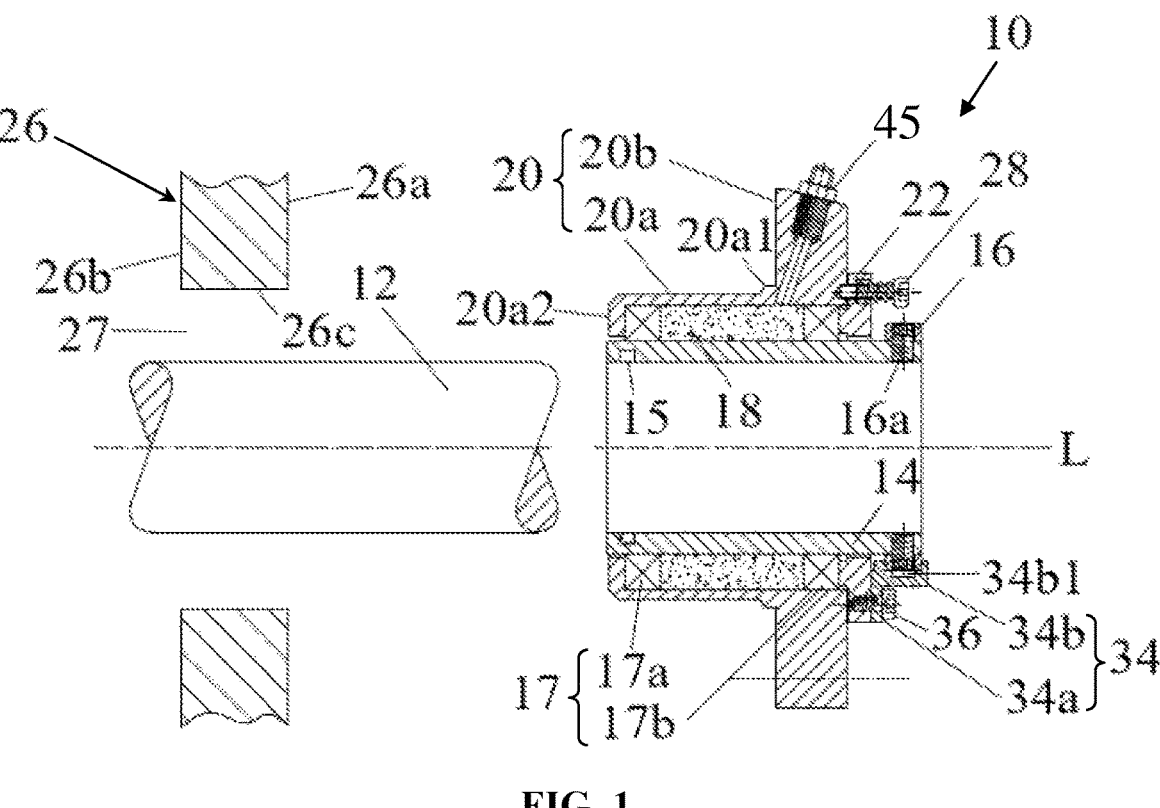
FIG. 1 is a cartridge sealing device with a semi-solid mud filler before being mounted between a rotating shaft and an enclosure of fluid equipment according to one embodiment of the present application.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is Particularly stated otherwise.

Techniques, methods and apparatus as known by one of ordinary skill in the relevant art cannot be discussed in detail but are intended to be part of the specification where appropriate.

The following description of one or more exemplary embodiments is merely illustrative in nature and is not intended to limit the present disclosure, its application, or uses. Therefore, other exemplary embodiments can have different values, structures, or features.

It should be noted that the same reference numerals and letters refer to the same items in the subsequent figures, and thus once an item is defined in one figure, it cannot be further discussed for the subsequent figures.

Figure 2:
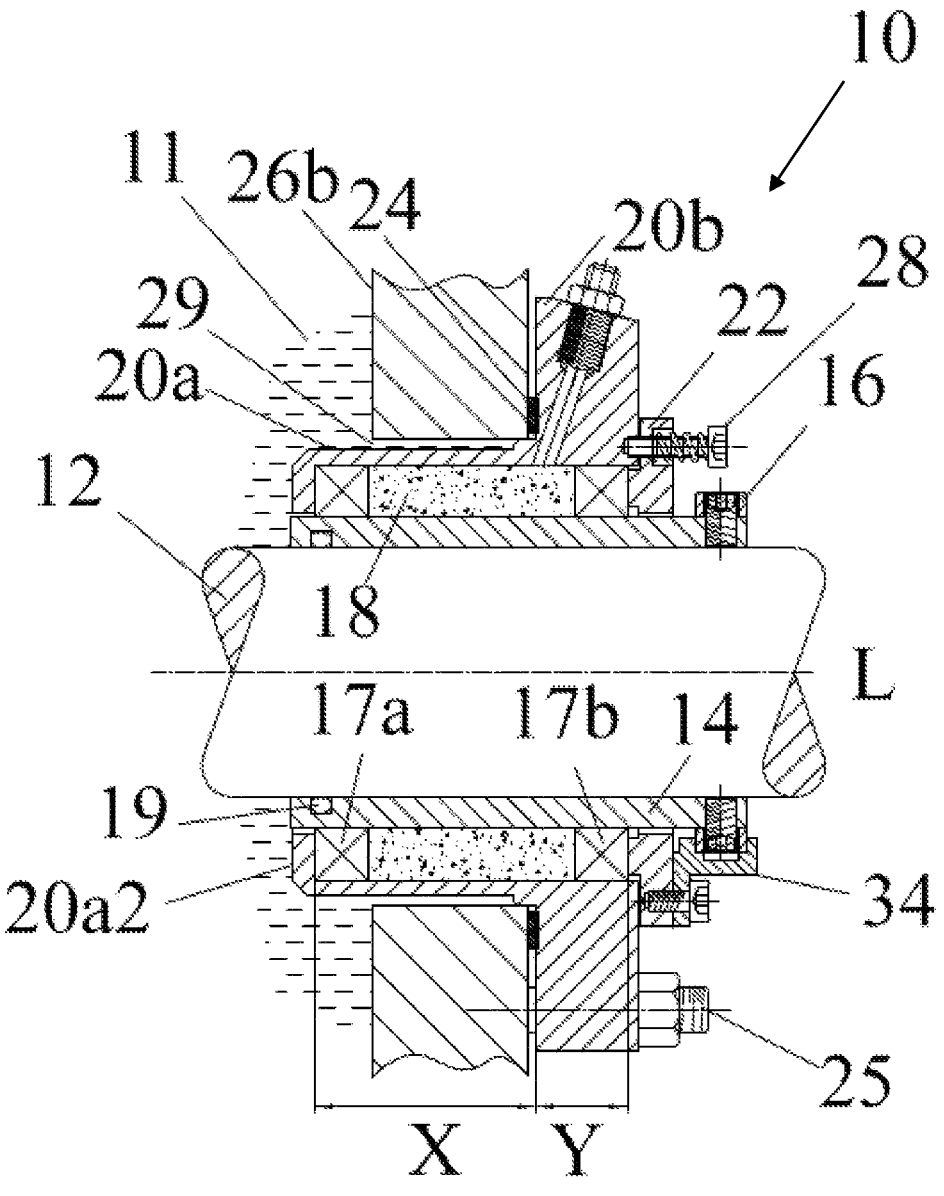
FIG. 2 is a cross-sectional view of the device of FIG. 1 after being mounted between the rotating shaft and the enclosure.

As shown in FIGS. 1 and 2, the application generally relates to a cartridge sealing device 10 configured to be mounted to a port 27 of an enclosure 26 of fluid equipment through which a rotating shaft 12 is inserted for preventing fluid 11 within the enclosure 26 from leaking through the port 27. FIG. 1 is a cross-sectional view of the device 10 before being mounted between the rotating shaft 12 and the enclosure 26 and FIG. 2 is a cross-sectional view of the device 10 after being mounted between the rotating shaft 12 and the enclosure 26. The enclosure 26 can be a part of the pump as mentioned above or any other fluid equipment having a rotating shaft 12.

The device 10 is described herein based on that the device 10 is mounted between the rotating shaft 12 and the enclosure 26. The terms "front" and "rear" are defined along an axis L of the device 10, the term "front" is directed to a side axially close to the fluid 11 in the enclosure 26, and the term "rear" is directed to a side axially away from the fluid 11 in the enclosure 26. The terms "inner" and "outer" are defined perpendicular to the axis L, the term "inner" is directed to a side radially close to the axis L, and the term "outer" is directed to a side radially away from the axis L.

Generally, the device 10 comprises a shaft sleeve 14, a locking ring 16, a shaped sealing ring assembly 17, a semi-solid mud filler 18, a cylindrical main gland 20, an annular auxiliary gland 22, a support frame 42, and one or more detachable positioning blocks 34 that are all mounted around the rotating shaft 12. The support frame 42 is removed to clearly illustrate the filler 18 in FIGS. 1-2, 4, 8-9 and 11, and the filler 18 is removed to clearly illustrate the support frame 42 in FIG. 6.

The shaft sleeve 14 is made from a hard material including any one of metal, ceramic, alloy, silicon carbide or a combination thereof.

As shown in FIG. 1, the locking ring 16 surrounds a rear end of the shaft sleeve 14 to secure the shaft sleeve 14 to the rotating shaft 12. For example, one or more fastening screws can be screwed into one or more threaded holes 16a extending radially through the locking ring 16 and pass through the rear end of the shaft sleeve 14, thereby securing the shaft sleeve 14 to the rotating shaft 12. Thus, the shaft sleeve 14 rotates with the rotating shaft 12. For example, the shaft sleeve 14 has an outer peripheral surface with a substantially constant diameter.

The shaft sleeve 14 has a front end with an inner peripheral surface forming a groove 15 for accommodating an elastic and for example O-type sealing ring 19 (as shown in FIG. 2), so as to form a seal between the shaft sleeve 14 and the rotating shaft 12.

As shown in FIG. 2, the main gland 20 has a cylinder 20a at its front end and a step-shaped portion 20b at its the rear end, the step-shaped portion 20b extending outwardly relative to the cylinder 20a.

The step-shaped portion 20b is configured to be fastened to a rear end face 26a of the enclosure 26 surrounding the port 27 via for example a sealing gasket 24 (for example, a spacer, or an elastic member made from fiber, rubber, etc.) and by means of one or more bolts 25, thereby forming a seal between the rear end face 26a of the enclosure 26 and the step-shaped portion 20b (i.e., the main gland 20). The cylinder 20a extends axially through the port 27 (as shown in FIG. 1), preferably axially extends beyond a front end face 26b of the enclosure 26 surrounding the port 27, thereby forming a gap 29 between an outer peripheral surface of the cylinder 20a and an inner wall surface 26c of the enclosure 26 that forms the port 27 to allow the fluid 11 to flow therein.

Figure 3:
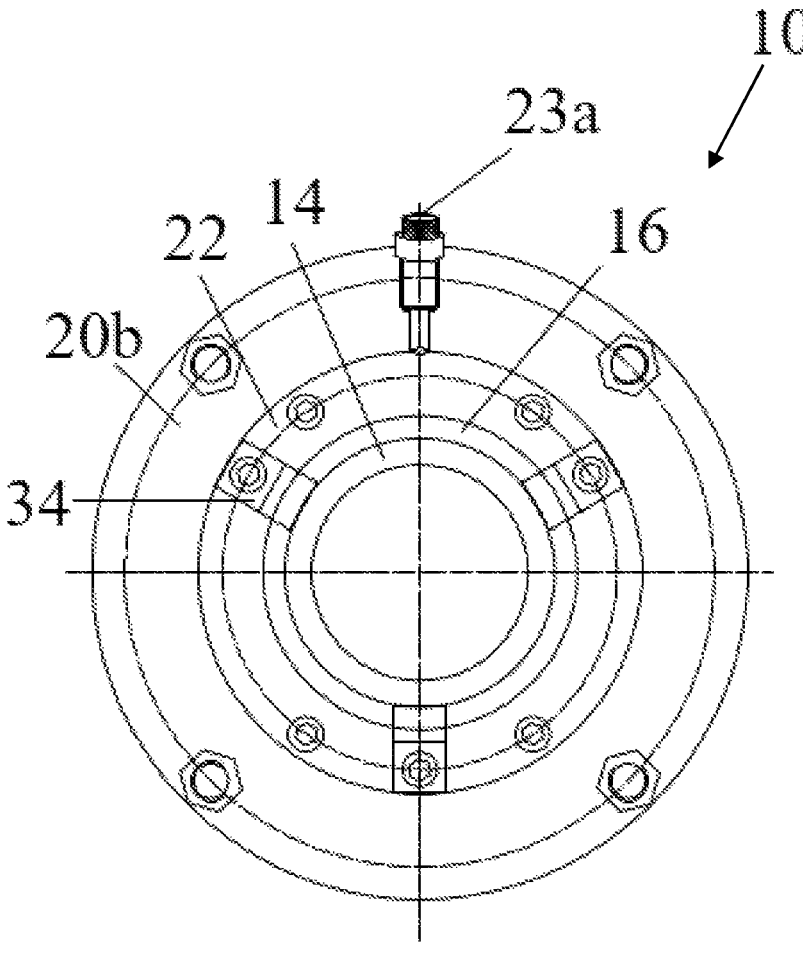
FIG. 3 is an end view of the device of FIG. 1.

The step-shaped portion 20b has an outer contour with any one of a circular shape (as shown in FIG. 3), a waist shape, a drum shape, a square shape, and a wing shape to match the enclosure 26.

As shown in FIGS. 1 and 2, the cylinder 20a has a rear end that is connected to, for example, integrally formed with, the step-shaped portion 20b. Optionally, a convex ring 20a1 is formed by the outer peripheral surface of the rear end of the cylinder 20a, extends axially into the port 27 and terminates the gap 29. The convex ring 20a1 has an axial length that is significantly smaller than that of the cylinder 20a and can be ignored.

The cylinder 20a has an inner peripheral surface surrounding the outer peripheral surface of the shaft sleeve 14 to form a cylindrical space within which the shaped sealing ring assembly 17 and the filler 18 are filled. Particularly, the cylinder 20a has an abutment step-shaped portion 20a2 at its front end, the abutment step-shaped portion 20a2 extending inwardly relative to the inner peripheral surface of the cylinder 20a to form a clearance between the inner peripheral surface of the abutment step-shaped portion 20a2 and the outer peripheral surface of the shaft sleeve 14, so as to facilitate the cylinder 20a (i.e., the main gland 20) to be clearance fitted to the outer peripheral surface of the shaft sleeve 14. For example, the abutment step-shaped portion 20a2 has a front end face that can be radially aligned with a front end face of the shaft sleeve 14 to achieve a compact structure.

The shaped sealing ring assembly 17 comprises a first shaped sealing ring 17a and a second shaped sealing ring 17b and between which the filler 18 is located.

For example, the number of each of the first shaped sealing ring 17a and the second shaped sealing ring 17b can be at least one.

Particularly, when the shaped sealing ring assembly 17 comprises multiple first shaped sealing rings 17a, the multiple first shaped sealing rings 17a are axially arranged in close proximity along the axis L. Similarly, when the shaped sealing ring assembly 17 comprises multiple second shaped sealing rings 17b, the multiple second shaped sealing rings 17b are axially arranged in close proximity along the axis L.

For example, each of the first shaped sealing ring 17a and the second shaped sealing ring 17b can be formed as separable components.

Particularly, at least one of the first shaped sealing ring 17a and the second shaped sealing ring 17b can be split along its axial cross section into a first shaped sealing ring component and a second shaped sealing ring component to facilitate splicing the first shaped sealing ring component and the second shaped sealing ring component around the rotating shaft 12.

As shown in FIG. 2, the device 10 has an axial length X from a front end face of the first shaped sealing ring 17a to a front end face of the step-shaped portion 20b in the cylindrical space that is more than twice an axial length Y from a rear end face of the second shaped sealing ring 17b to a front end face of the step-shaped portion 20b, thereby axially extending the gap 29.

The auxiliary gland 22 has a rear end that is fastened to a rear end face of the step-shaped portion 20b by means of a pre-tightening mechanism 28 such that a front end of auxiliary gland 22 protrudes axially forward into the cylindrical space and abuts against the second shaped sealing ring 17b. In other words, the front end face of the first shaped sealing ring 17a abuts against the rear end face of the abutment step-shaped portion 20a2, the rear end face of the second shaped sealing ring 17b abuts against the front end of the auxiliary gland 22, an outer peripheral surface of the shaped sealing ring assembly 17 abuts against the inner peripheral surface of the cylinder 20a, and an inner peripheral surface of the shaped sealing ring assembly 17 abuts against the outer peripheral surface of the shaft sleeve 14.

Figure 4:
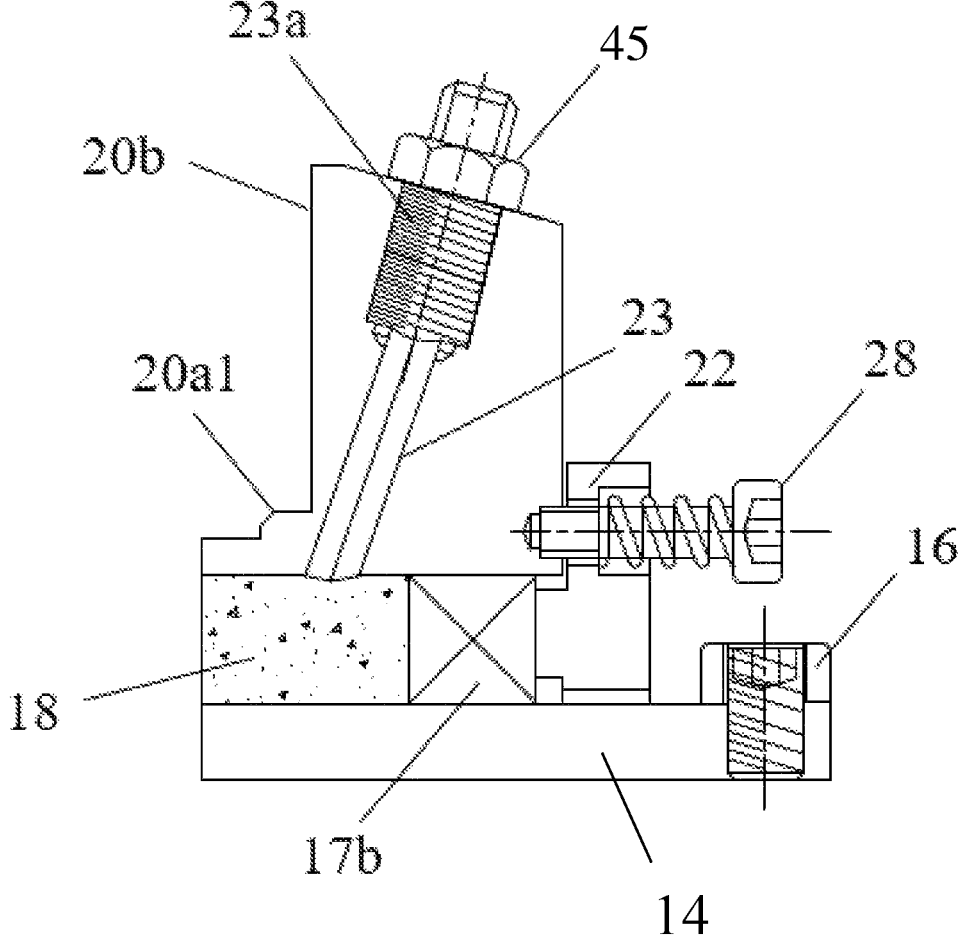
FIG. 4 is a partial cross-sectional view of a portion of the device of FIG. 1.

As shown in FIG. 4, the auxiliary gland 22 has an inner peripheral surface that is in clearance fit with the outer peripheral surface of the shaft sleeve 14, the inner peripheral surface of the front end of the auxiliary gland 22 has a diameter that is larger than that of the inner peripheral surface of the rear end of the auxiliary gland 22, and the outer peripheral surface of the front end of the auxiliary gland 22 has a diameter that is smaller than that of the inner peripheral surface of the step-shaped portion 20b, such that the front end of the auxiliary gland 22, as an axial protrusion, an smoothly protrude into the cylindrical space. Thus, the shaped sealing ring assembly 17 and the filler 18 have a total axial length that is not greater than that of the cylindrical space, such that the second shaped sealing ring 17b would not extend axially beyond the rear end of the step-shaped portion 20b.

The shaped sealing ring assembly 17 can be a stripe (also called packing) woven from soft fibers or made from rubber and have elastic and plastic properties.

The filler 18 can be made from a mixture of fiber and lubricant that is made from a mixture of solid powder and oil.

Optionally, the step-shaped portion 20b comprises a through hole 23 extending from an outer peripheral surface to an inner peripheral surface of the step-shaped portion 20b to communicate with the cylindrical space. The through hole 23 has an axis forming an angle of, for example, greater than 60° with the axis L of the device 10 and has a portion forming a threaded joint 23a extending along the axis of the through hole 23 close to the outer peripheral surface of the step-shaped portion 20b. The threaded joint 23a can be blocked by a nut 25 when the device 10 is in a normal operation mode. When it is desired to add the filler 18, the nut 25 is removed from the threaded joint 23a for connecting an interface of an external injector (e.g., a charging gun) to the threaded joint 23a, such that the filler 18 is injected into the cylindrical space by means of the external injector and is tightly pressed between the rear end face of the first shaped sealing ring 17a and the front end face of the second shaped sealing ring 17b. Thus, a sealing pressure formed in the cylindrical space is increased.

Figure 5:
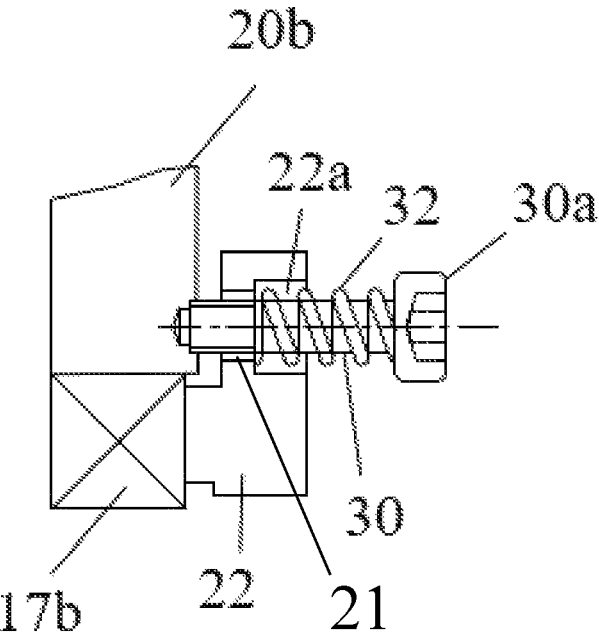
FIG. 5 is a partial cross-sectional view of a portion of the device of FIG. 4.

As shown in detail in FIG. 5, the pre-tightening mechanism 28 can comprise a bolt 30 having a head 30a and a screw rod and a spring 32 mounted around the bolt 30. When the bolt 30 passes through a hole 21 axially extending through the auxiliary gland 22 and screwed into a threaded hole axially extending into the rear end face of the step-shaped portion 20b, one end of the spring 32 abuts against the head 30a and the other end of the spring 32 abuts against the rear end face of the auxiliary gland 22 or the bottom of a recess 22a of the auxiliary gland 22 such that the auxiliary gland 22 is fastened to the main gland 20 by a pre-tightening force provided by compressing the spring 32. Thus, the auxiliary gland 22 can be axially displaced relative to the main gland 20 by resisting against the pre-tightening force and a gap can be present between a front end face of the rear end of the auxiliary gland 22 that does not protrude into the cylindrical space and the rear end face of the step-shaped portion 20b. It should be appreciated that the hole 21 of the auxiliary gland 22 has a diameter that is larger than that of the screw rod and smaller than that of the head 30a. The spring 32 can comprise any one of a disc spring that can provide a greater pre-tightening force in a shorter stroke and a coil spring (as shown in FIG. 5) that can provide a less pre-tightening force in a longer stroke.

On the one hand, when the threaded joint 23a is blocked by the nut 25, the sealing pressure can be adjusted by means of the pre-tightening mechanism 28. For example, if the bolt 30 is tightened, the pre-tightening force applied to the shaped sealing ring assembly 17 and the filler 18 can be increased, and if the bolt 30 is loosened, the pre-tightening force applied to the shaped sealing ring assembly 17 and the filler 18 can be reduced. Furthermore, the shaped sealing ring assembly 17 and the filler 18 can be taken out axially and replaced by a new shaped sealing ring assembly after the auxiliary gland 22 is removed from the step-shaped portion 20b, and then the filler 18 can be injected into the cylindrical space from the through hole 23 by means of the external injector after the auxiliary gland 22 is fastened to the step-shaped portion 20b.

On the other hand, the pre-tightening mechanism 28 can alleviate an impact of shock and vibration on the auxiliary gland 22.

Particularly, when the filler 18 is injected into the cylindrical space, the sealing pressure in the cylindrical space increases sharply to act on the auxiliary gland 22 by resisting against the pre-tightening force, such that the auxiliary gland 22 is axially displaced away from the main gland 20. When the sealing pressure in the cylindrical space decreases, the auxiliary gland 22 can be axially displaced close to the main gland 20. For example, the shaped sealing ring assembly 17 can be worn when the device 10 is in the normal operation mode, such that the total axial length of the shaped sealing ring assembly 17 and the filler 18 is reduced, and the auxiliary gland 22 can be axially displaced close to the main gland 20 so as to compensate for the reduction of the total axial length until that a front end face of the front end of the auxiliary gland 22 is in contact with the rear end face of the step-shaped portion 20b.

Figure 6:
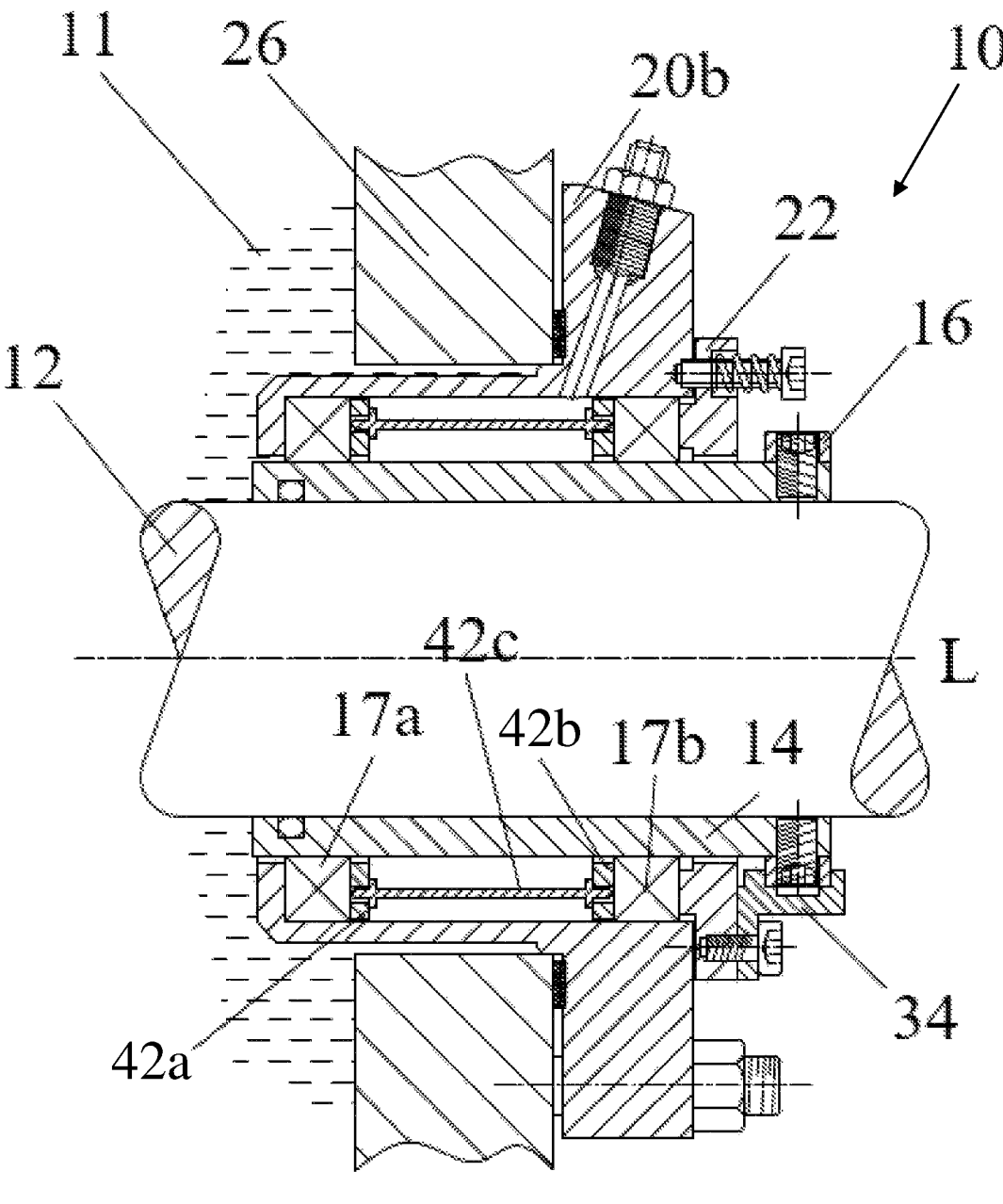
FIG. 6 is a cross-sectional view of a cartridge sealing device with a semi-solid mud filler and configured to be mounted to fluid equipment according to one embodiment of the present application.

As shown in FIG. 6, or returning to FIGS. 2 and 3, the locking ring 16 is rotatable relative to the one or more positioning blocks 34 and the device 10 can be integrated into a cartridge by means of the one or more positioning blocks 34, that is, the shaft sleeve 14, the locking ring 16, the shaped sealing ring assembly 17, the filler 18, the main gland 20 and the auxiliary gland 22 are packaged together, such that device 10 can be mounted around or removed from the rotating shaft 12 in one step.

For example, the locking ring 16 can be axially positioned relative to the shaft sleeve 14 by the one or more positioning blocks 34. Particularly, the positioning block 34 comprises a first portion 34a and a second portion 34b that are angled, e.g., perpendicular, to each other, and one or more bolts 36 that extend axially through the first portion 34a are used to fasten the positioning block 34 to the rear end face of the auxiliary gland 22. The first portion 34a has an axial length that is less than that of the auxiliary gland 22. Furthermore, the first portion 34a has an axial length that is equal to a distance between the rear end face of the auxiliary gland 22 and a front end face of the locking ring 16. It should be appreciated that the auxiliary gland 22 is adjacent to the locking ring 16 to achieve a compact structure.

The second portion 34b comprises an annular groove 34b1 for receiving an outer periphery of the locking ring 16, or the locking ring 16 has an outer periphery forming an annular groove into which a radial projection formed by the outer periphery of the second portion 34b can be inserted, thereby limiting the locking ring 16 from moving axially relative to the shaft sleeve 14 and allowing the locking ring 16 to rotate relative to the shaft sleeve 14. After the device 10 is mounted around the rotating shaft 12 in one step with the one or more positioning blocks 34 by means of the one or more fastening screws and before the rotating shaft 12 is rotated during an operation of the fluid equipment, the one or more positioning blocks 34 shall be removed from the shaft sleeve 14. When it is desired to remove the device 10 mounted around the rotating shaft 12 in one step, the one or more positioning blocks 34 shall be remounted relative to the locking ring 16 and the one or more fastening screws shall be loosened.

Figure 7:
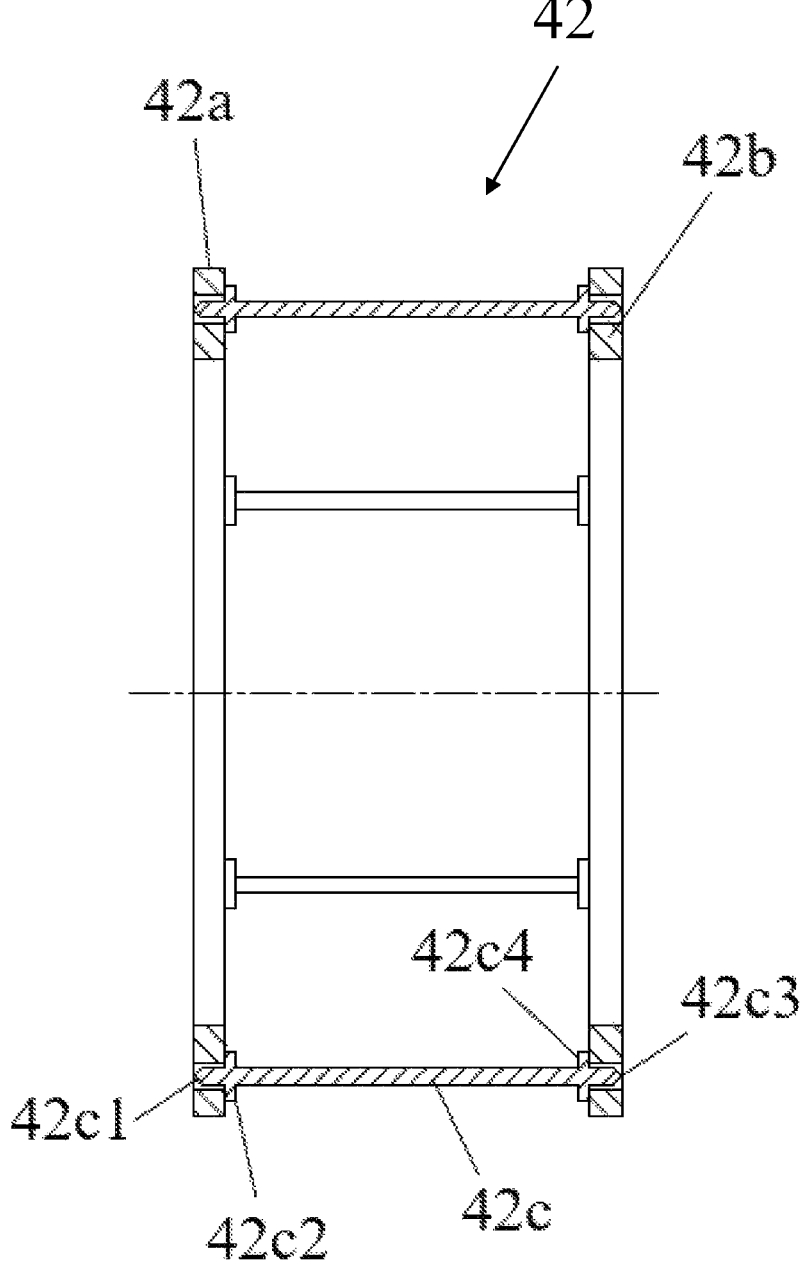
FIG. 7 is a cross-sectional view of a support frame of the device of FIG. 6.

As shown in FIG. 6, the support frame 42 comprises one or more axial rods 42c located between the first shaped sealing ring 17a and the second shaped sealing ring 17b and suspended in the cylindrical space to help the filler 18 resist an excessive external pressure, for example, the pre-tightening force. The one or more axial rods 42c can be elastic. As shown in detail in FIG. 7, the support frame 42 further comprises a first support ring 42a abutting against the rear end face of the first shaped sealing ring 17a and a second support ring 42b abutting against the front end face of the second shaped sealing ring 17b. If there are multiple axial rods 42c, the multiple axial rods 42c can be evenly distributed around peripheries of the first support ring 42a and the second support ring 42b. each axial rod 42c has two axial ends connected to the first support ring 42a and the second support ring 42b respectively. For example, each axial rod 42c comprises a first tip 42c1, a first stopper 42c2 protruding relative to the first tip 42c1, a second tip 42c3, and a second stopper 42c4 protruding relative to the second tip 42c3. The first tip 42c1 is slidably inserted into a corresponding hole of the first support ring 42a, and the second tip 42c3 is slidably inserted into a corresponding hole of the second support ring 42b, such that an interval between the first shaped sealing ring 17a and the second shaped sealing ring 17b can be varied between a minimum interval and a maximum interval. When the interval is varied from the maximum interval to the minimum interval, the auxiliary gland 22 is displaced axially forward until the first stopper 42c2 abuts against the first support ring 42a and the second stopper 42c4 abuts against the second support ring 42b. When the interval is varied from the minimum interval to the maximum interval, the auxiliary gland 22 is displaced axially backward until the spring 32 is completely compressed.

The support frame 42 can maintain the minimum interval even when subjected to the excessive external pressure. In the meanwhile, the support frame 42 allows the interval to be varied from the minimum interval to the maximum interval, thereby preventing the filler 18 from overheating, expanding or even losing as measured by % loss on ignition (LOI) as the sealing pressure in the cylindrical space is accumulated during the injection of the filler 18.

Furthermore, the first support ring 42a has an inner diameter that is larger than that of the first shaped sealing ring 17a (i.e., the diameter of an inner peripheral surface of the first shaped sealing ring 17a) and an outer diameter that is smaller than that of the first shaped sealing ring 17a (i.e., the diameter of an e outer peripheral surface of the first shaped sealing ring 17a).

Figure 8:
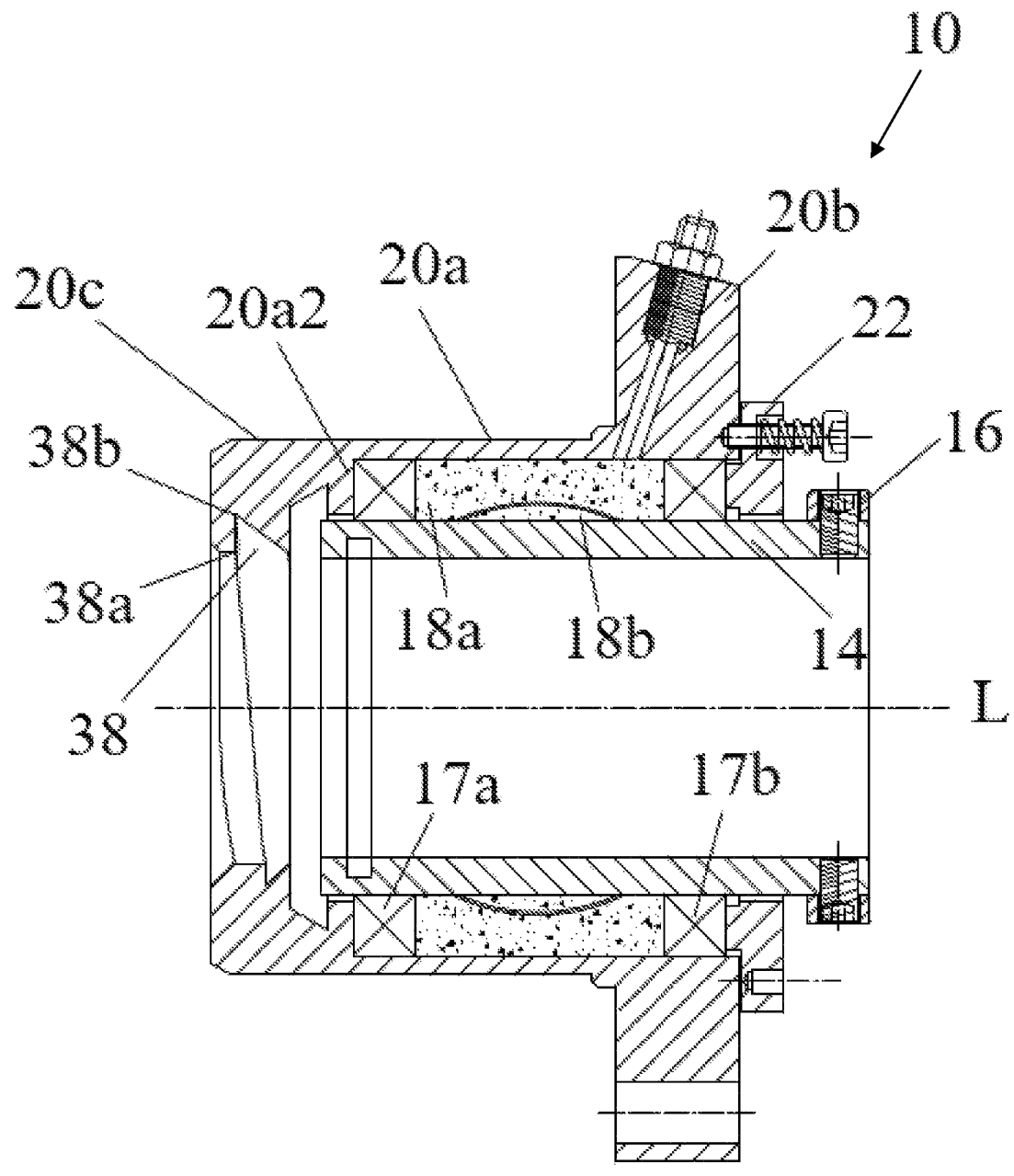
FIG. 8 is a cross-sectional view of a cartridge sealing device with a semi-solid mud filler and configured to be mounted to fluid equipment according to one embodiment of the present application.

As shown in FIG. 8, when the one or more positioning blocks 34 are removed such that the shaft sleeve 14 rotates with the rotating shaft 12, the filler 18 is divided into a stationary portion 18a engaged with/attached to/contacted with or close to the inner peripheral surface of the cylinder 20a, the rear end face of the first shaped sealing ring 17a, and the front end face of the second shaped sealing ring 17b so as to remain substantially stationary and a rotating portion 18b (for example, mostly composed of the fiber) slidably engaged with/attached to/contacted with the stationary portion 18a and wound around or close to the outer peripheral surface of the shaft sleeve 14 so as to rotate with the shaft sleeve 14.

Optionally, each axial rod 42c can be closer to the inner peripheral surface of the cylinder 20a than the outer peripheral surface of the shaft sleeve 14 to avoid the rotating portion 18b of the filler 18 such that the support frame 42 remains substantially stationary.

When the rotating shaft 12 rotates, the rotating portion 18b slides relative to the stationary portion 18a to generate a large amount of heat, nevertheless, the fluid 11, especially liquid, can circulate into the gap 29 to flow around a main part of the filler 18, thereby significantly cooling the filler 18.

Optionally, referring to FIG. 8, the device 10 can further comprise an additional cylinder 20c integrally formed with a front end of the cylinder 20a for discharging impurities and having an inner peripheral surface forming a helical or spiral groove 38, which has a rotation direction that is the same as that of the rotating shaft 12 (for example, clockwise). The spiral groove 38 extends along a spiral line with a spiral pitch angle, has a start point that is close to or located at the front end face of the additional cylinder 20c, and has an end point that is close to or located at a rear end face of the additional cylinder 20c which can coincide with or a front end face of the cylinder 20a, i.e., of the abutment step-shaped portion 20a2, such that the spiral groove 38 is separated from the cylindrical space.

For example, the spiral groove 38 has a radial depth, an axial width and/or a sectional area that remain constant or gradually increase from the start point to the end point.

Generally, the radial depth is measured from a groove top 38a with a smaller diameter to a groove bottom 38b with a larger diameter. The axial width is measured on a reference line that is parallel to an axis of the spiral groove 38. The sectional area is taken from an axial section of the spiral groove 38 and calculated based on at least the radial depth.

As shown in FIG. 8, in a case where the radial depth gradually increases, the groove bottom 38*b*'s diameter gradually increases from the start point to the end point, while the groove top 38*a*'s diameter can be kept substantially constant. Furthermore, the groove top 38*a* can have a minimum diameter that is smaller than the shaft sleeve 14's outer diameter (i.e., the diameter of an outer peripheral surface of the shaft sleeve 14) and larger than the shaft sleeve 14's inner diameter (i.e., the diameter of an inner peripheral surface of the shaft sleeve 14).

Figure 9:
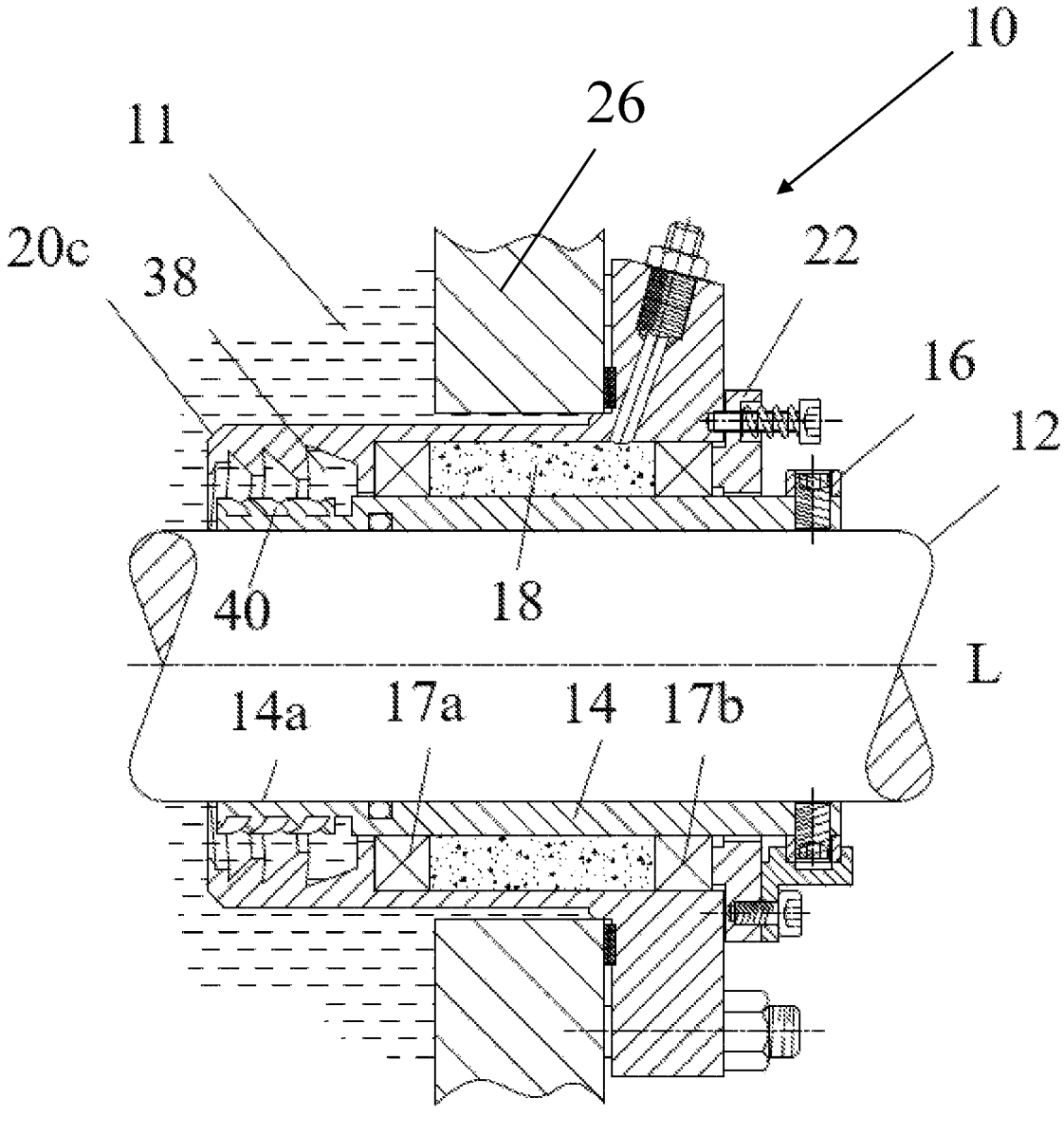
FIG. 9 is a cross-sectional view of a cartridge sealing device with a semi-solid mud filler and configured to be mounted to fluid equipment according to one embodiment of the present application.

As shown in FIG. 9, in a case where the radial depth gradually increases, the groove top 38*a*'s diameter gradually increases from the start point to the end point, while the groove bottom 38*b*'s diameter can be kept substantially constant. Furthermore, the groove top 38*a* can have a minimum diameter that is larger than the shaft sleeve 14's outer diameter.

When the rotating shaft 12 rotates, the spiral groove 38 remains stationary and cooperates with the rotating shaft 12 to prevent the fluid 11, especially particulate impurities in liquid, from entering into the cylindrical space to damage a seal between the shaft sleeve 14 and the main gland 20.

Figure 10:
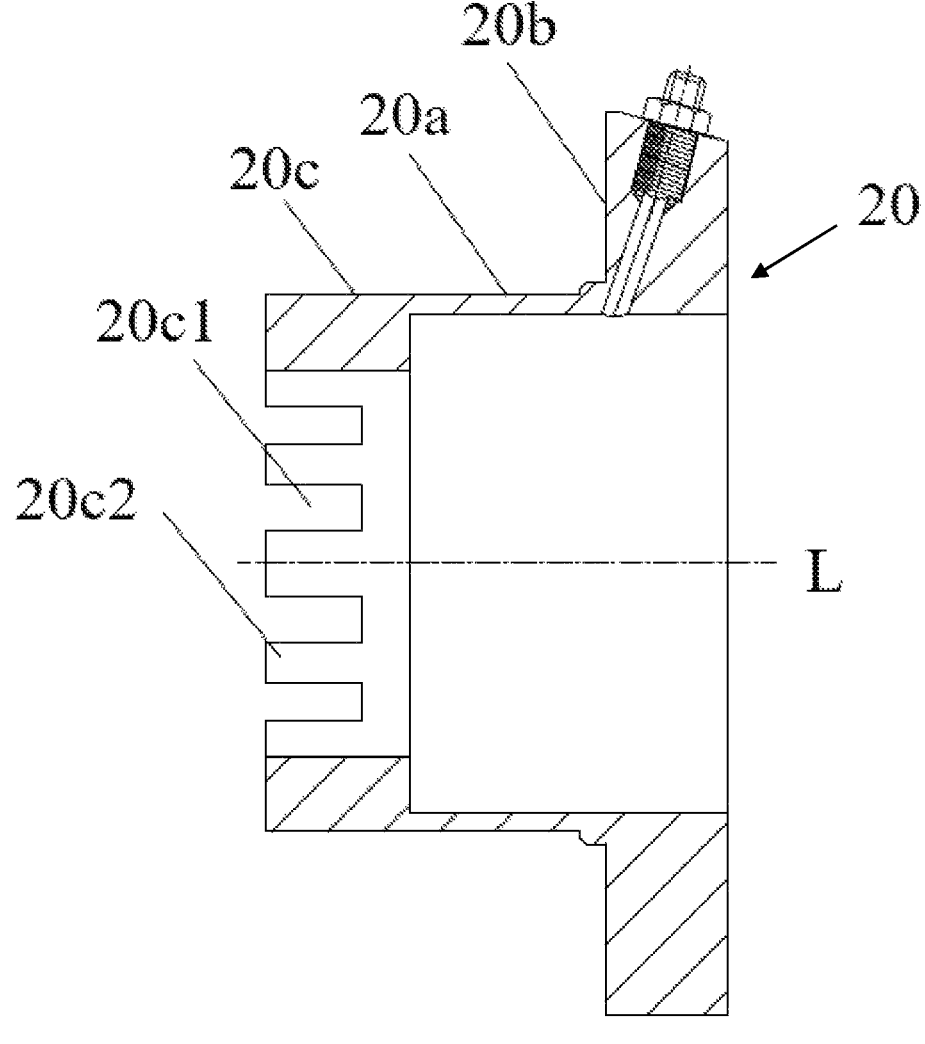
FIG. 10 is a cross-sectional view of a portion of a cartridge sealing device with a semi-solid mud filler and configured to be mounted to fluid equipment according to one embodiment of the present application.

Optionally, referring to FIG. 10, the front end face of the additional cylinder 20*c* is formed with a plurality of notches 20*cl* or teeth 20*c2* radially and optionally equidistantly spaced from each other and penetrating and/or extending from an outer peripheral surface of the additional cylinder 20*c* to an inner peripheral surface of the additional cylinder 20*c*. The plurality of notches 20*cl* or teeth 20*c2* are separated from the cylindrical space. The plurality of notches 20*cl* or teeth 20*c2* can be straight along, inclined relative to, and/or spiral around an axis of the additional cylinder 20*c* which coincides with the axis L of the device 10 (as shown in FIG. 10).

Figure 11:
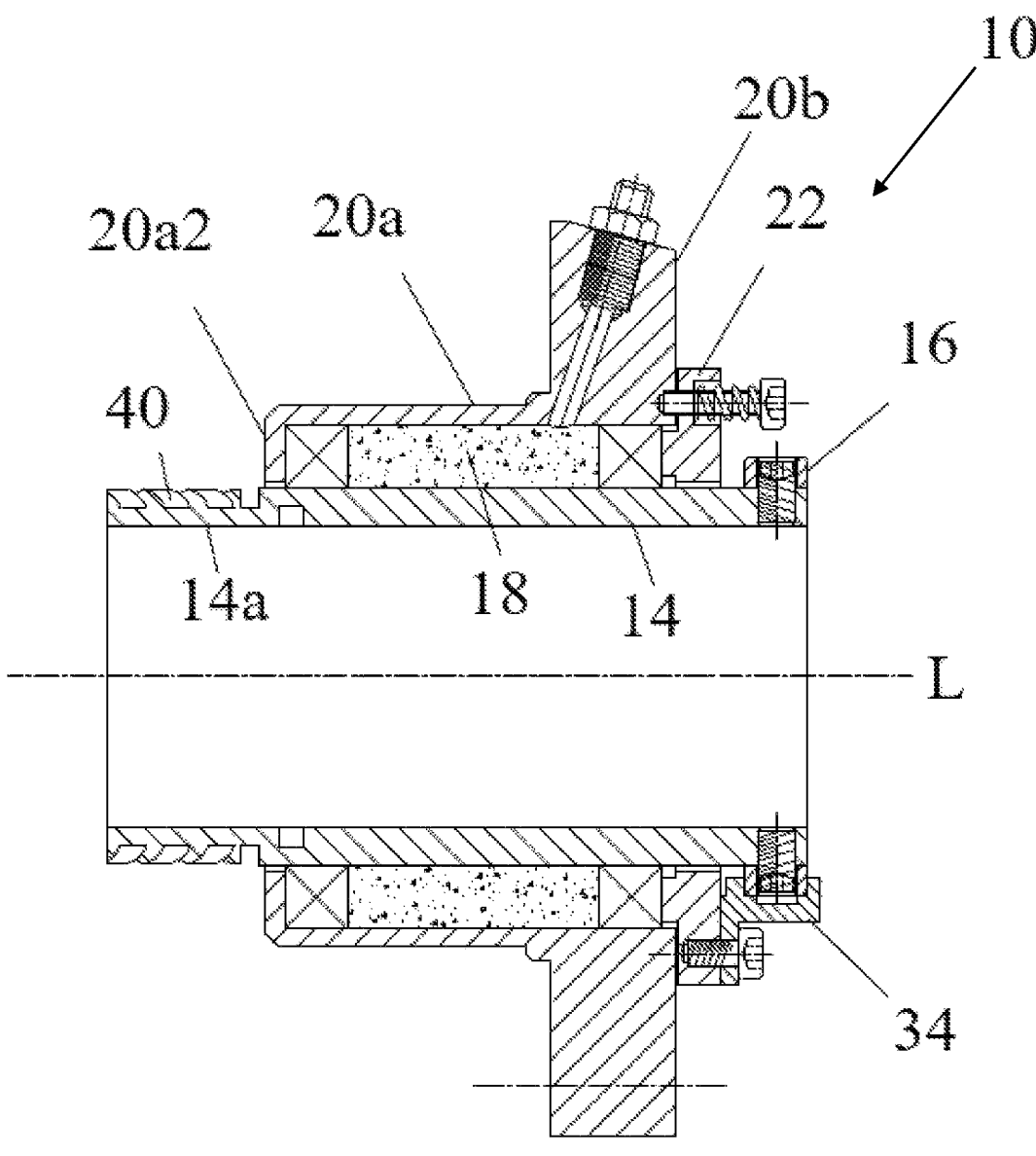
FIG. 11 is a cross-sectional view of a cartridge sealing device with a semi-solid mud filler and configured to be mounted to fluid equipment according to one embodiment of the present application.

Optionally, referring to FIG. 11, the device 10 comprises an additional shaft sleeve 14*a* integrally formed with a front end of the shaft sleeve 14 for discharging the impurities, having an outer peripheral surface forming a plurality of toothed rings 40 axially spaced from each other and effected as a pump. The plurality of toothed rings 40 are separated from the cylindrical space and can have any one of straight teeth, oblique teeth, helical teeth or a combination thereof.

Figure 12:
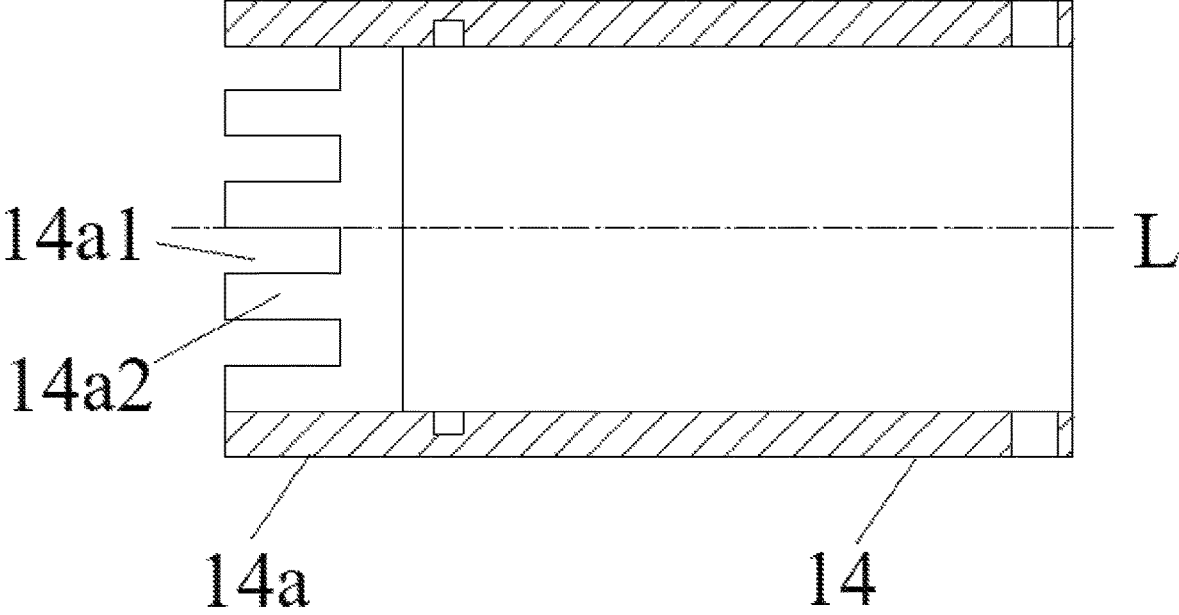
FIG. 12 is a cross-sectional view of a portion of a cartridge sealing device with a semi-solid mud filler and configured to be mounted to fluid equipment according to one embodiment of the present application.

Optionally, referring to FIG. 12, the additional shaft sleeve 14*a* has a front end face formed with a plurality of notches 14*al* or teeth 14*a2* radially and optionally equidistantly spaced from each other and penetrating and/or extending from an outer peripheral surface of the additional shaft sleeve 14*a* to an inner peripheral surface of the additional shaft sleeve 14*a*. The plurality of notches 14*al* or teeth 14*a2* are separated from the cylindrical space. The plurality of notches 14*al* or teeth 14*a2* can be straight along, inclined relative to, and/or spiral around an axis of the additional shaft sleeve 14*a* which coincides with the axis L of the device 10) (as shown in FIG. 12).

When the rotating shaft 12 rotates, the shaft sleeve 14 and thus the toothed rings 40 rotate with the rotating shaft 12 to prevent the fluid 11, especially the particulate impurities in the liquid, from entering the cylindrical space to damage the seal between the shaft sleeve 14 and the main gland 20.

Returning to FIG. 9, when the particulate impurities in the liquid are excessive, the additional cylinder 20*c* and the additional shaft sleeve 14*a* can be combined, in which the spiral groove 38 of the additional cylinder 20*c* is radially spaced to the toothed rings 40 of the additional shaft sleeve 14*a*. The additional cylinder 20*c* can have an axial length that is equal to that of the additional shaft sleeve 14*a* in FIG. 9, but it is not necessary. It should be understood that the additional cylinder 20*c* and the additional shaft sleeve 14*a* have various features that can be flexibly combined or implemented separately.

Although some specific embodiments of the present disclosure have been demonstrated in detail with examples, it should be understood by those skilled in the art that the above examples are only intended to be illustrative but not to limit the scope of the present disclosure and the above embodiments could be modified without departing from the scope and spirit of the present disclosure.

The invention claimed is:

1. A cartridge sealing device configured to be mounted to a port of an enclosure of fluid equipment through which a rotating shaft is inserted for preventing fluid within the enclosure from leaking through the port, the cartridge sealing device comprising:

a shaft sleeve, a locking ring, a shaped sealing ring assembly, a semi-solid mud filler, a cylindrical main gland, an annular auxiliary gland, a support frame, and one or more detachable positioning blocks that are all mounted around the rotating shaft, wherein:

the main gland has a cylinder at a front end and a step-shaped portion at a rear end, the step-shaped portion extending outwardly relative to the cylinder;

the step-shaped portion is configured to be fastened to a rear end face of the enclosure surrounding the port, while the cylinder passes through the port, thereby forming a gap between an outer peripheral surface of the cylinder and an inner wall surface of the enclosure that forms the port to allow the fluid to flow therein;

the cylinder has an inner peripheral surface surrounding an outer peripheral surface of the shaft sleeve to form a cylindrical space within which the shaped sealing ring assembly and the filler are filled and within which the filler is flowable;

the step-shaped portion comprises a through hole extending from an outer peripheral surface to an inner peripheral surface of the step-shaped portion to communicate with the cylindrical space, the through hole having a portion forming a threaded joint that is close to the outer peripheral surface of the step-shaped portion;

the shaped sealing ring assembly comprises a first shaped sealing ring and a second shaped sealing ring between which the filler is located;

the auxiliary gland is fastened to a rear end face of the step-shaped portion by a pre-tightening mechanism such that a front end of the auxiliary gland protrudes axially forward into the cylindrical space from the rear end face of the step-shaped portion and abuts against the second shaped sealing ring;

the support frame comprises one or more axial rods located between the first shaped sealing ring and the second shaped sealing ring and suspended in the cylindrical space;

the locking ring surrounds a rear end of the shaft sleeve to secure the shaft sleeve to the rotating shaft;

the one or more detachable positioning blocks are configured to connect the locking ring to the auxiliary gland such that the cartridge sealing device can be mounted around or removed from the rotating shaft in one step and are configured to be removed from the locking ring and the auxiliary gland such that the locking ring and the shaft sleeve can rotate with the rotating shaft during an operation of the fluid equipment;

the one or more axial rods are configured such that an interval between the first shaped sealing ring and the second shaped sealing ring can be varied between a minimum interval and a maximum interval; and the threaded joint is adapted to be connected to an external injector for injecting the filler into the cylindrical space so as to increase a sealing pressure formed in the cylindrical space or to be blocked such that the sealing pressure can be adjusted by the pre-tightening mechanism.

2. The cartridge sealing device of claim 1, wherein the cartridge sealing device has an axial length from a front end face of the first shaped sealing ring to a front end face of the step-shaped portion that is more than twice an axial length from a rear end face of the second shaped sealing ring to the front end face of the step-shaped portion.

3. The cartridge sealing device of claim 1, wherein the cartridge sealing device further comprises at least one of an additional cylinder formed integrally with a front end of the cylinder and having an inner peripheral surface forming a spiral groove or a front end face forming a plurality of notches radially spaced from each other and extending from an outer peripheral surface to an inner peripheral surface of the additional cylinder; or the cartridge sealing device further comprises an additional shaft sleeve formed integrally with a front end of the shaft sleeve and having an outer peripheral surface forming a plurality of toothed rings axially spaced from each other or a front end face forming a plurality of notches radially spaced from each other and extending from an outer peripheral surface to an inner peripheral surface of the additional shaft sleeve.

4. The cartridge sealing device of claim 3, wherein the spiral groove has a start point that is close to or located at the front end face of the additional cylinder and an end point that is close to or located at a rear end face of the additional cylinder and is separated from the cylindrical space and has at least one of a radial depth, axial width or a sectional area that remain constant or gradually increase from the start point to the end point.

5. The cartridge sealing device of claim 3, wherein the plurality of toothed rings are separated from the cylindrical space and have at least one of straight teeth, oblique teeth, helical teeth or a combination thereof.

6. The cartridge sealing device of claim 1, wherein the filler is made from a mixture of fiber and lubricant that is made from a mixture of solid powder and oil.

7. The cartridge sealing device of claim 1, wherein the support frame further comprises a first support ring abutting against a rear end face of the first shaped sealing ring and a second support ring abutting against a front end face of the second shaped sealing ring, and each of the one or more axial rods comprises a first tip, a first stopper protruding relative to the first tip, a second tip and a second stopper protruding relative to the second tip, the first tip being slidably inserted into the first support ring and the second tip being slidably inserted into the second support ring such that the first stopper abuts against the first support ring and the second stopper abuts against the second support ring when the minimum interval is reached.

8. The cartridge sealing device of claim 7, wherein the pre-tightening mechanism comprises a bolt passing through a hole axially extending through the auxiliary gland and screwed into a threaded hole formed on a rear end face of the step-shaped portion and a spring mounted around the bolt, the auxiliary gland being fastened to the main gland by a pre-tightening force provided by compressing the spring such that the auxiliary gland can be axially displaced relative to the main gland by resisting against the pre-tightening force and a gap can be present between a front end face of a rear end of the auxiliary gland that does not protrude into the cylindrical space and the rear end face of the step-shaped portion, and the spring being completely compressed when a maximum interval is reached.

9. The cartridge sealing device of claim 1, wherein a number of each of the first shaped sealing ring and the second shaped sealing ring is at least one.

10. The cartridge sealing device of claim 1, wherein each of the first shaped sealing ring and the second shaped sealing ring is formed as separable components.

11. The cartridge sealing device of claim 1, wherein a number of each of the first shaped sealing ring and the second shaped sealing ring is at least one and each of the first shaped sealing ring and the second shaped sealing ring is formed as separable components.

\* \* \* \* \*